Oct. 6, 1970    P. M. COFFMAN    3,532,786
SOLID STATE FORMING OF PLASTICS
Filed Dec. 14, 1967    2 Sheets-Sheet 1

INVENTOR:
PAUL M. COFFMAN
BY: *Martin S Baer*
HIS ATTORNEY

Oct. 6, 1970     P. M. COFFMAN     3,532,786
SOLID STATE FORMING OF PLASTICS
Filed Dec. 14, 1967     2 Sheets-Sheet 2

INVENTOR:
PAUL M. COFFMAN
BY: *Martin S. Baer*
HIS ATTORNEY

United States Patent Office 3,532,786
Patented Oct. 6, 1970

3,532,786
SOLID STATE FORMING OF PLASTICS
Paul M. Coffman, Cherry Hill, N.J., assignor to Shell Oil Company, New York, N.Y., a corporation of Delaware
Filed Dec. 14, 1967, Ser. No. 690,498
Int. Cl. B29b *1/14;* B29c *17/03;* B29d *23/13*
U.S. Cl. 264—292                                5 Claims

ABSTRACT OF THE DISCLOSURE

According to this invention, stretch-forming of a billet modified by having a weakened area of pre-determined proportions results in the production of articles in which the ratios of bottom to sidewall thickness and sidewall to billet thickness are different from those which result from use of an unmodified billet.

In a preferred mode of the invention, shallow-drawn articles having substantially identical sidewall and bottom thickness can be formed by stretch-forming a disc-shaped billet in which about 8 percent of the total billet volume is removed from a disc-shaped central area about one fourth of the total area under the plunger.

BACKGROUND OF THE INVENTION

This invention is an improvement in a method for forming articles by stretching thermoplastics in the solid state.

Hollow containers, such as cans, can be produced by a method in which the periphery of a billet of thermoplastic material is clamped and the central, unclamped portion is gradually deformed while in the solid state by forcing a plunger down on it, resulting in plastic being drawn from under the plunger to form the sidewalls of the container as the plunger descends. The sidewalls of the resulting container are oriented in the direction of the draw. For convenience of reference, this method will herein be referred to as "stretch-forming."

It has been found in such stretch-forming of predominantly crystalline thermoplastics that at depths of draw [1] up to about 1.25:1 there is a relatively constant ratio between the thickness of the original billet and the thickness of the sidewalls of the drawn article, regardless of the depth of draw. This observed thickness ratio is characteristic for each thermoplastic and corresponds approximately to the so-called "natural draw ratio" [2] of the material. In the case of polypropylene, for example, this ratio is about 6:1.

It is a consequence of this effect that articles having bottom and sidewalls of approximately equal thickness are formed by stretch-forming at a depth of draw of about 1.25:1. This happens to be a desired depth of draw for many articles. The process is therefore useful for forming many typical articles, such as cans and deep boxes. However, if it is desired to form an article at relatively shallow draw, such as a box shape having relatively short sides, e.g., a desk drawer, the result is that the bottom of the drawn article is excessively thick. This is inherent in the stretch-forming method, in which articles are shaped under tension.

Another consequence of the described effect is that it is not possible to produce, by stretch-forming, articles of substantial draw depth which have an average wall thickness substantially greater than about ⅕ or ⅙ of original billet thickness.

SUMMARY AND OBJECTS OF THE INVENTION

It is a primary object of this invention to provide a method for producing articles by stretch-forming thermoplastics in the solid state which permits articles of controlled ratio of bottom to sidewall thickness, and preferably of substantially uniform bottom and sidewall thickness, to be formed at relatively shallow draw depths, e.g., between 0.2:1 and 1:1.

Another object is to provide a method for producing articles by stretch-forming thermoplastics in the solid state which permits the production of articles having sidewall thickness up to the thickness of the original billet.

Other objects will be apparent from the following description.

According to this invention, containers and similar hollow articles of controlled sidewall and bottom thickness are formed by stretch-forming billets in which a portion of the billet is reduced in thickness or otherwise weakened. This resuts in a reduced degree of stretching of plastic from the unweakened area and preferential stretching of plastic originally in said weakened area. The placement and dimensions of the area to be thus reduced in thickness or weakened and the required amount of thinning or weakening are primarily functions of the geometry of the article to be formed, including the desired depth of draw, and are readily determined in each instance.

BRIEF DESCRIPTION OF THE DRAWING

Referring to FIG. 1, a forming press comprises a female die unit 10 having a cavity or chamber 11 and an annular seat 12 for a blank or billet W. As illustrated in FIG. 1, billet W is shaped with a centrally thinned portion in accordance with the present invention. An annular rim-clamping plunger 13 is suitably mounted by means not shown to enter the enlarged upper portion of the die chamber and clamp the outer edge or rim of the blank upon the annular seat 12.

Figure 2:
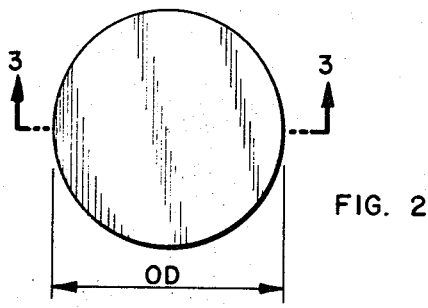
FIG. 2 is a plan view of an unmodified billet.

A forming plunger 15 is arranged to move through the inner cylindrical opening 16 of annular rim plunger 13 to engage the interior portion of blank W within the outer annular clamped rim portion. The annular space between

---

[1] Depth of draw refers to the ratio between the diameter or average length of side of the billet and the length of the drawing stroke in which the sidewalls are formed.

[2] The term "draw ratio" is ordinarily applied in the drawing of filaments and refers to the ratio of the final linear dimension after drawing to the original linear dimension. In the drawing of filaments, it is the ratio of denier of the filament after stretching to denier before stretching. Crystalline, substantially unoriented fibers, upon drawing in the solid state, usually show a shoulder effect; the undrawn and drawn portions of such fibers are separated by a shoulder portion at which the fiber "necks down." The "natural draw ratio" is that draw ratio at which the entire fiber has been stretched to the reduced diameter which it naturally tends to assume. More generally expressed, the natural draw ratio is the draw ratio at the point in a stress-strain diagram where the tensile stress begins to rise sharply after the second or lower yield point, as defined in ASTM standard on Plastics, Appendix II, D628.

the inner edge of seat 12 and the outer periphery of the forward end of forming plunger 15 is at least sufficient to accommodate the sidewall of the article as it is being drawn.

Figure 1:
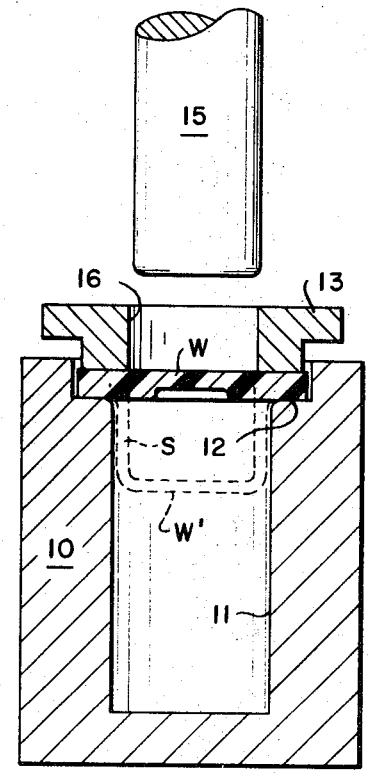
FIG. 1 is a simplified sectional view in elevation of an apparatus suitable for practicing the present invention, the parts being shown with a billet in position for forming and with a stretch-formed article in phantom view.

Numerous modifications may be made in the apparatus of FIG. 1, as will be evident to persons skilled in the art. The illustration of the apparatus is simplified by eliminating a number of ordinarily desirable features such as heat exchange means, fluid passage, and the like, which are not essential for illustration of the present invention, and other obvious features, such as means for moving and guiding rim-plunger 13 and forming plunger 15, means for ejecting the formed article, and the like.

In the drawing process, the billet is placed in position while at a temperature below its crystal melting point. Rim clamping plunger 13 is forced down on the billet with at least sufficient axial pressure to hold the billet securely against pulling out as the article is formed. It may leave the rim at any desired thickness, from substantially the full thickness of the original blank down to a very thin rim. Plunger 15 is then forced down upon billet W by means not shown. As the plunger descends after having engaged the top surface of the billet, plastic material is drawn under tension from the area of the billet under the plunger bottom and forms the sidewall S of the article. At the completion of a shallow draw, the shape of the drawn article is that illustrated in FIG. 1 in phantom outline as W'.

At the completion of the plunger stroke, the plunger is withdrawn and the formed article is ejected by suitable means, not shown; this may, for example, comprise an ejection ram, a fluid pressure pulse, or a split die.

FIGS. 2 through 10 of the drawing, together with Table 1, illustrate the relationship of shape of billet and shape of drawn article, utilizing both flat billets and billets shaped according to this invention. In order to facilitate explanation of the invention by reference to FIGS. 2 to 10, the drawings and data are presented in idealized form, omitting, for example, minor variations in thickness which may occur in the walls and bottoms of the article.

Figure 3:
FIG. 3 is a section through line 3—3 of the billet of FIG. 2.
Figure 4:
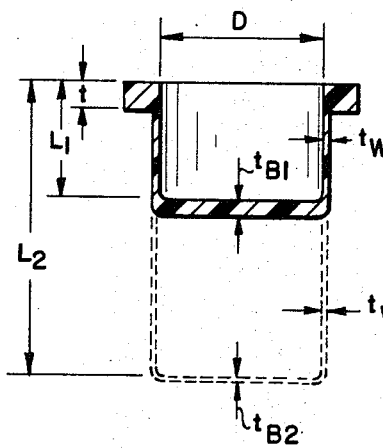
FIG. 4 is a section through a shallow-drawn article, stretch-formed from the billet of FIGS. 2 and 3 and illustrating in phantom outline a section through a deep-drawn article stretch-formed from the same billet.

FIGS. 2 through 4 illustrate an unmodified flat, circular billet and the configuration of shallow drawn and deep drawn articles produced therefrom by stretch-forming.

Figure 5:
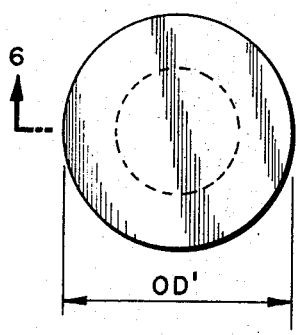
FIG. 5 is a plan view of a billet having a thinned central section, as used in the present invention.
Figure 6:
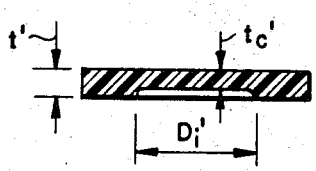
FIG. 6 is a vertical section through line 6—6 of FIG. 5.
Figure 7:
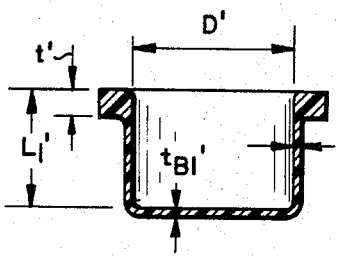
FIG. 7 is a section through a shallow-drawn article, stretch-formed from the billet of FIGS. 5 and 6.

FIGS. 5 through 7 illustrate a circular billet modified in accordance with the present invention by provision of a thinned central portion and the configuration of a shallow drawn article produced therefrom by stretch-forming.

Figure 8:
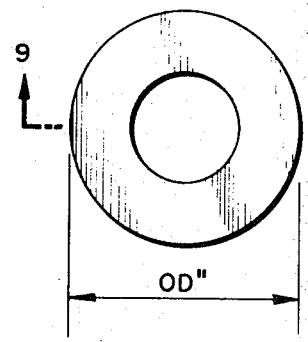
FIG. 8 is a plan view of a billet in the shape of an annular flat disc.
Figure 9:
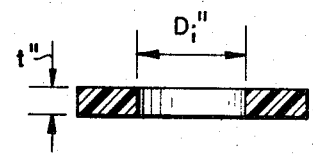
FIG. 9 is a vertical section through line 9—9 of FIG. 8.
Figure 10:
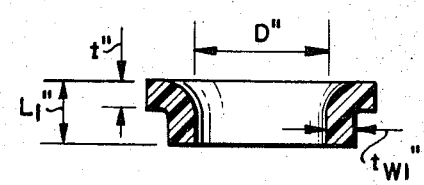
FIG. 10 is a section through an article produced by stretch-forming the billet of FIGS. 8 and 9.

FIGS. 8 through 10 illustrate a flat circular billet modified by having the central area completely removed, leaving a flat, annular disc, and the configuration of an article produced therefrom by stretch-forming. In this case, the wall thickness equals the billet thickness and is not dependent on the depth of draw.

Dimensions representative of the billets and formed articles of FIGS. 2 through 10 are set out in Table 1.

bottom, whereas stretch-forming an identical billet to a relatively shallow draw (stretch ratio 0.5:1) results in an article which has essentially the same wall thickness as the deep drawn article but a much greater bottom thickness.

The billet illustrated in FIGS. 5 and 6 represents the billet of FIGS. 2 and 3, modified by thinning the central portion thereof. In the modified billet described in Table 1, the thinned central area is circular, having ½ of the diameter of the billet portion under the punch and hence ¼ the area of the billet portion under the punch. The thickness of the thinned portion is ⅔ the billet thickness. The modified billet, therefore, contains about 8 percent less material in the area under the punch than does the unmodified billet.

FIG. 7 and Table 1 illustrate that a shallow draw of the modified billet (stretch ratio 0.5:1) results in an article having substantially identical wall and bottom thickness. They further illustrate the fact that the wall thickness produced by stretch-forming the billet of FIGS. 5 and 6 is greater (twice in this instance) than the wall thickness resulting from stretch-forming unmodified billets of identical thickness. Hence, as illustrated in Table 1, a shallow drawn article of a given wall thickness can be formed from a billet shaped according to the present invention in which the original billet thickness is much less than the thickness of a flat unmodified billet required for forming an article having the same wall thickness.

FIGS. 8 and 9 represent the billet of FIGS. 2 and 3 with the central portion completely removed. FIG. 10 and Table I illustrate that stretch-forming thin billet results in a bottomless tube or flange whose wall thickness is the same as the original billet thickness. The billet of FIGS. 8 and 9, as illustrated in Table 1, may be modified by reducing the area of the central opening relative to the total area. This would cause sufficient tension to be exerted on the sidewalls during stretch-forming to result in formation of an article whose sidewalls are thinner than the original billet thickness, and which may have a full or partially open bottom.

FIGS. 2 to 4 and Table 1 illustrate the constant relationship between the thickness of the original unmodified billet and the sidewall of the article. In the illustrated case, the wall thickness is one sixth of the billet thickness. A thickness reduction of this order is inherent in the stertch-forming method, in which the sidewall is formed from material drawn under tension from the original billet mass.

Table 1 also illustrates that the thinned central area of the modified billet is substantially reduced in thickness during the stretch-forming process and that the sidewall thickness of the resulting article is substantially greater than one sixth of the billet thickness.

It should be understood that some variation in wall thickness is ordinarily found in stretch-formed articles

TABLE 1

| | | Figures 2–4 unmodified billet | | | Figures 5–7 modified billet | | | Figures 8–10 monified billet (annular) | |
|---|---|---|---|---|---|---|---|---|---|
| Billet thickness, inches | $t$ | .600 | .300 | $t'$ | .690 | .300 | $t''$ | .600 | .300 |
| Billet center thickness, inches | | | | $t_c'$ | .400 | .200 | $t_c''$ | 0 | 0 |
| Outside diameter, inches | OD | 12 | 12 | $OD_1$ | 12 | 12 | $OD''$ | 12 | 12 |
| Diameter of stretched area, inches | D | 10 | 10 | $D'$ | 10 | 10 | $D''$ | 10 | 10 |
| Diameter of thinned area, inches | | | | $D_i'$ | 5 | 5 | $D_i''$ | 5 | 5 |
| Shallow draw: | | | | | | | | | |
| Depth of draw, inches | $L_1$ | .5 | .5 | $L_1'$ | .5 | .5 | $L_1''$ | ¹2.5 | ¹2.5 |
| Draw ratio | $L_1/D$ | .5 | .5 | $L_1/D'$ | .5 | .5 | $L_1''/D''$ | ¹.25 | ¹.25 |
| Wall thickness, inches | $t_{w1}$ | .100 | .050 | $t'_{w1}$ | .200 | .100 | $t''_{w1}$ | .600 | .300 |
| Bottom thickness, inches | $t_{B1}$ | .400 | .200 | $t'_{B1}$ | .200 | .100 | | | |
| Deep draw: | | | | | | | | | |
| Depth of draw, inches | $L_2$ | 12.5 | 12.5 | | | | | | |
| Draw ratio | $L_2/D$ | 1.25 | 1.25 | | | | | | |
| Wall thickness, inches | $t_{w2}$ | .100 | .050 | | | | | | |
| Bottom thickness, inches | $t_{B2}$ | .100 | .050 | | | | | | |

¹ About.

It will be seen from the drawing and the table that stretch-forming of the unmodified billet of FIGS. 2 to 4 results in deep drawn article (stretch ratio of 1.25:1) having substantially the same thickness of sidewall and and that small changes in the ratio of wall thickness to bottom thickness can be achieved in the stretch-forming process by various modifications, e.g., by changes in the coefficient of friction between punch and billet. However, the gross variation in the ratio of wall thickness to billet thickness which is achieved by the method of this invention has not been found to be achieved by other modifications of the stretch-forming process.

high density polyethylene, polyamides (nylon), polyesters, and the like. The invention is particularly advantageous for use with polyolefins such as isotactic polypropylene, polypropylene modified for impact improvement, includ-

TABLE 2

|  | Unmodified billet | Modified billet |
|---|---|---|
| Billet dimensions: | | |
| Billet thickness, in | 0.375 | 0.375 |
| Billet center thickness, in | 0.375 | 0.250 |
| Diameter of stretched area, in | 11 | 11 |
| Diameter of thinned area, in | | 6 |
| Depth of draw, in | ¹ 6½ | ¹ 6½ |

| Average wall thickness (mils) and ratio to billet thickness | Thickness | Ratio | Thickness | Ratio to unthinned portion | Ratio to thinned portion |
|---|---|---|---|---|---|
| Inches from top: | | | | | |
| 1 | 149 | .40 | 133 | .35 | .53 |
| 2 | 103 | .37 | 128 | .34 | .51 |
| 3 | 84 | .22 | 120 | .32 | .48 |
| 4 | 73 | .18 | 118 | .31 | .47 |
| 5 | 67 | .18 | 130 | .35 | .52 |
| 6 | 65 | .17 | 120 | .32 | .48 |
| Average | 90 | .24 | 125 | .33 | .50 |
| Average, last 4 inches | 72 | .18 | 122 | .33 | .49 |
| Average bottom thickness (mils) and ratio to billet thickness | 225 | .60 | 40 | .11 | .16 |

¹ About.

The following example illustrates the present invention by means of measurements made on shallow-drawn articles formed from an unmodified and a modified billet. The billets were commercial isotactic polypropylene in the shape of discs of ⅜ inch thickness and 12 inch diameter. In the modified billet, a central billet area 6 inches in diameter was machined to remove ⅛ inch of the material from the bottom of the billet, leaving a central area of about ¼ inch thickness. The edges of the cut were radiused. The billets were stretch-formed on apparatus of the type illustrated by FIG. 1 while at a temperature of 320° F., utilizing a nylon-tipped punch about 11 inches in diameter. The gap between the die and punch was about 150 mils wide. The wall thickness of the formed articles was measured at several points around the circumference of the article at one inch intervals from the top of the article. The resulting averages are shown in Table 2.

In the article formed from the modified billet, illustrated in Table 2, the central area had been thinned to a greater extent than was required to produce an article of uniform wall thickness and bottom thickness. A central area of about the same diameter but slightly greater thickness, between about 0.250 and 0.300 inch, would result in forming an article having a bottom thickness essentially the same as the wall thickness.

Table 2 also illustrates that the wall thickness in the article stretch-formed from the flat, unthinned billet tapered down quickly in the first two inches to slightly over one third the billet thickness and then gradually to about one sixth of the billet thickness at a draw depth of 6 inches, while the wall thickness of the article produced from the modified billet was practically uniform throughout its length, at about one third of the thickness of the unthinned portion of the billet and about half the thickness of the thinned center portion.

The method of this invention is applicable in general to thermoplastic materials which normally exist in crystalline or partially crystalline form. These materials are characerized by a tensile stress-strain curve which shows a reduction of tensile stress immediately following the first yield point, a drop in tensile stress to the second yield point, and a subsequent rise in tensile stress substantially above the first yield point. Such polymers are characteristically employed for use as textile fibers and are characterized by the draw-down or necking effect which results in a thinning of an article, such as a fiber, upon drawing in the solid state to a reduction in area which is characteristic of the polymer. Such polymers are, for example, commercial prevailingly isotactic polypropylene, ing block copolymers with other olefins, and high density polyethylene.

Stretch-forming in accordance with this invention is carried out at a temperature at which the polymer exists in the solid state, i.e., below the crystal melting point of crystalline polymer. It may be desirable to stretch form polymer at an elevated temperature, provided it is substantially below the crystalline melting point, e.g., 5° F. or more below said melting point. It is essential that the polymers remain in the solid state in order to achieve the desired orientation effect. Illustrative of suitable temperatures for polypropylene is the range from 60 to 330° F., a preferred range being from 280°–330° F.

The preferred method of providing a weakened central billet area according to the present invention consists of reducing the central area of the billet in thickness, compared to the remaining area. This may be achieved by any desired technique, e.g., by machining or by coining a flat billet, or by compression molding or injection milding the desired shape, or the like. The depression corresponding to the difference in volume between the remaining central portion of a shaped billet and the corresponding portion of a flat billet is referred to herein as the "indent."

In another mode of producing such billets, a shaped disc, e.g., a flat annular disc, may be welded by known methods to a flat disc to provide a billet of the desired shape. The discs may be of identical composition or may be made of different materials. In the latter case, laminated articles are produced. Laminates of more than two layers may also be employed in the stretch-forming process.

Another method of providing a weakened central area consists of reducing the resistance to flow in the central area without changing the dimensions of the billet, e.g., by heating the central portion of the billet in such a manner that the central portion is significantly warmer, such as by at least 5° F., than the remainder of the billet at the time the stretching operation is carried out.

In the preferred mode, the precise shape of the thinned central area is separately determined for each application. It is primarily a function of the desired configuration, especially the desired depth of draw; of the natural draw ratio of the polymer; and of the processing conditions, including temperature and relative friction coefficient between polymer and punch surface.

In the preferred mode, the remaining thinned central area of the billet is from 20 to 60 percent of the total area under the punch. Its thickness is from 50 to 90 percent of the thickness of the unthinned area of the billet. The corresponding thickness of the indent is 10 to 50 percent of the thickness of the unthinned area of the billet. The volume of the "indent," compared to the volume of a corresponding unmodified billet, is suitably from 3 to 25 percent.

In another mode, the central area of the billet is completely removed; stretch forming of such a billet may produce an article having a wall thickness approximately equal to the billet thickness, as illustrated in FIGS. 8–10.

Stretch-forming billets in which the thickness of the thinned area is greater than zero and less than about 50 percent of the thickness of the unthinned area tends to result in articles in which the wall thickness substantially exceeds the bottom thickness. Stretch-forming of such billets is also within the compass of this invention.

In the case of circular billets, the thinned or otherwise weakened central area will normally be circular. It is preferably formed with "radiused," i.e., rounded edges, as illustrated in FIG. 6. The radius of curvature of the rounded edge is not critical. It may be in the range from ⅙ to ⅛ inch, suitably being ¼ to ½ the depth of the indent.

It is also within the scope of the present invention to vary the thickness of the billet or otherwise weaken it in other than the central area in order to achieve selective drawing of polymer from the weakened area.

I claim as my invention:

1. The method of forming an integral hollow article having a bottom and contiguous sidewalls which comprises clamping a solid-state-deformable thermoplastic billet at its periphery, forcing a plunger down on the billet inside the clamped portion, and continuing to move the plunger while the plastic mass of the billet in solid state is fed out under tension from the part of the billet under the plunger to form the sidewalls of said article, wherein said billet is a flat shape having at its center a weakened area of about 20 to 60 percent of the bottom area of the plunger, the extent of said weakened area and its resistance to drawing under tension in the solid state being predetermined to result in formation of an article which has a bottom thickness substantially less than the said weakened area and a predetermined ratio of thickness of the bottom of the resulting shaped article to the sidewalls thereof which is substantially less than the ratio resulting from carrying out the same shaping method on a billet of uniform thickness and strength.

2. The method of claim 1 wherein said billet is a circular disc of polypropylene and the central portion of said billet is thinned compared to the remainder of the billet, the thinned area being defined, compared to a billet of uniform thickness, by a circular indent having an area in the range from about 20 to 60 percent of the bottom area of said plunger and a thickness in the range from about 10 to about 50 percent of the thickness of the unthinned portion of said billet.

3. The method of claim 1 wherein said weakening is accomplished by increasing the temperature of said weakened area relative to that of the remainder of the billet.

4. The method of forming an integral hollow article having a bottom and contiguous sidewalls which comprises clamping at its periphery a centrally thinned circular billet of isotactic polypropylene at a temperature at least about 5° F. below its crystalline melting point, forcing a plunger down on the billet inside the clamped portion, and continuing to move the plunger while polypropylene is fed out under tension from the part of the billet under the plunger to form the sidewalls of said article, wherein the draw ratio between the depth of draw and the diameter of the bottom contact area of the plunger is in the range from about 0.2 to about 1 and wherein said billet is a flat circular disc having a disc-shaped indent at its center which has an area from about 20 to about 60 percent of the bottom area of the plunger and thickness in the range from about 10 to about 50 percent of the thickness of the unthinned portion of said billet, the area and thickness of said indent being predetermined to result in formation of an article which has a bottom thickness substantially less than the thickness of said indent and a predetermined ratio of thickness of the bottom of the resulting shaped article to the sidewalls thereof which is substantially less than the ratio resulting from carrying out the same shaping method on a billet of uniform thickness.

5. The method of forming an open hollow cylindrical article which comprises clamping at its periphery a solid-state-deformable thermoplastic billet having a thickness approximately equal to the desired wall thickness of the finished article and having a central aperture, forcing a plunger down on the billet inside the clamped portion, and continuing to move the plunger while the plastic mass of the billet in solid state is fed out under tension from the part of the billet under the plunger to form said article, wherein said billet is a flat shape having at its center an aperture of about 20 to 60 percent of the bottom area of the plunger.

References Cited
UNITED STATES PATENTS

| | | | |
|---|---|---|---|
| 893,739 | 7/1908 | Latham | 264—320 |
| 2,468,697 | 4/1949 | Wiley | 264—292 XR |
| 2,854,694 | 10/1958 | Mumford | 264—292 XR |
| 2,911,681 | 11/1959 | Distler | 264—292 |
| 3,220,544 | 11/1965 | Lovell | 264—90 XR |
| 3,298,893 | 1/1967 | Allen | 264—90 XR |

ROBERT F. WHITE, Primary Examiner

R. R. KUCIA, Assistant Examiner

U.S. Cl. X.R.

264—92, 320, 322